United States Patent
Liu et al.

(10) Patent No.: US 11,146,181 B2
(45) Date of Patent: *Oct. 12, 2021

(54) CONTROL METHOD AND APPARATUS FOR COMMON-MODE MODULATED WAVE OF SINGLE-PHASE FIVE-LEVEL INVERTER

(71) Applicant: HUAWEI TECHNOLOGIES CO., LTD., Guangdong (CN)

(72) Inventors: Fangcheng Liu, Shanghai (CN); Kai Xin, Shanghai (CN); Yunfeng Liu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,600

(22) Filed: Jun. 25, 2020

(65) Prior Publication Data

US 2020/0328697 A1    Oct. 15, 2020

Related U.S. Application Data

(63) Continuation of application No. PCT/CN2018/119762, filed on Dec. 7, 2018.

(30) Foreign Application Priority Data

Dec. 26, 2017 (CN) .......................... 201711439005.4

(51) Int. Cl.
*H02M 7/483* (2007.01)
*H02M 7/49* (2007.01)
*H02S 40/32* (2014.01)

(52) U.S. Cl.
CPC .............. *H02M 7/49* (2013.01); *H02M 7/483* (2013.01); *H02S 40/32* (2014.12)

(58) Field of Classification Search
CPC ......................................... H02M 7/42–7/5395
See application file for complete search history.

(56) References Cited

U.S. PATENT DOCUMENTS

| 2007/0268052 | A1 | 11/2007 | Yin et al. |
| 2015/0200602 | A1 | 7/2015 | Narimani et al. |
| 2016/0372927 | A1* | 12/2016 | Dent ....................... H02J 3/381 |

FOREIGN PATENT DOCUMENTS

| CN | 101860244 A | 10/2010 |
| CN | 102843054 A | 12/2012 |

(Continued)

OTHER PUBLICATIONS

H. Qu et al., "Investigation on a novel discontinuous pulse-width modulation algorithm for single-phase voltage source rectifier," 2014 17th International Conference on Electrical Machines and Systems (ICEMS), Hangzhou, 2014, pp. 1430-1436.

(Continued)

*Primary Examiner* — Peter M Novak
(74) *Attorney, Agent, or Firm* — Womble Bond Dickinson (US) LLP

(57) ABSTRACT

A control method and apparatus for a single-phase five-level converter are provided. The method includes: obtaining a first-phase initial modulated wave and a second-phase initial modulated wave of the single-phase five-level converter; obtaining a first-level modulated wave, a second-level modulated wave, a third-level modulated wave, a fourth-level modulated wave, and a fifth-level modulated wave that are output by the single-phase five-level converter; calculating the first-level modulated wave, the second-level modulated wave, the third-level modulated wave, the fourth-level modulated wave, the fifth-level modulated wave, the first-phase initial modulated wave, and the second-phase initial modulated wave, to obtain a common-mode modulated wave of the single-phase five-level converter; and (Continued)

calculating the first-phase initial modulated wave, the second-phase initial modulated wave, and the common-mode modulated wave, to obtain a pulse-width modulated wave of the single-phase five-level converter. Implementing the embodiments of this application can increase a system response speed and improve system reliability.

12 Claims, 6 Drawing Sheets

(56) References Cited

FOREIGN PATENT DOCUMENTS

| | | |
|---|---|---|
| CN | 103580465 A | 2/2014 |
| CN | 105790622 A | 7/2016 |
| CN | 106100430 A | 11/2016 |
| CN | 106533236 A | 3/2017 |
| CN | 106655848 A | 5/2017 |
| CN | 106961225 A | 7/2017 |
| CN | 107070258 A | 8/2017 |
| CN | 107070278 A | 8/2017 |
| CN | 107276445 A | 10/2017 |
| CN | 107508483 A | 12/2017 |
| CN | 108092534 A | 5/2018 |
| EP | 1860762 A3 | 3/2015 |
| JP | 2013038844 A | 2/2013 |

OTHER PUBLICATIONS

X. j. Yang et al., "Discontinuous PWM in single-phase grid-connected inverter," 2016 IEEE 11th Conference on Industrial Electronics and Applications (ICIEA), Hefei, 2016, pp. 651-657.

Tamasas Mohamed et al: "Evaluation of modulation techniques for 5-level inverter based on multicarrier level shift PWM", MELECON 2014 201417th IEEE Mediterranean Electrotechnical Conference, IEEE, Apr. 13, 2014, pp. 17-23, XP032597815.

Anandarup Das et al: "A Pulse Width Modulation technique for reducing switching frequency for modular multilevel converter", Power Electronics (IICPE), 2010 India International Conference on, IEEE, Jan. 28, 2011, pp. 1-6, XP031929665.

Liu Xudan et al: "Theoretical and experimental comparison of different control strategies for modular multilevel converters", 2014 IEEE 15th Workshop on Control and Modeling for Power Electronics (COMPEL), IEEE, Jun. 22, 2014 (Jun. 22, 2014), pp. 1-9, XP032628836.

* cited by examiner

CONTROL METHOD AND APPARATUS FOR COMMON-MODE MODULATED WAVE OF SINGLE-PHASE FIVE-LEVEL INVERTER

CROSS-REFERENCE TO RELATED APPLICATIONS

This application is a continuation of International Application No. PCT/CN2018/119762, filed on Dec. 7, 2018, which claims priority to Chinese Patent Application No. 201711439005.4, filed on Dec. 26, 2017. The disclosures of the aforementioned applications are hereby incorporated by reference in their entireties

TECHNICAL FIELD

This application relates to the field of electronic technologies, and in particular, to a control method and apparatus for a single-phase five-level inverted-converter (converter) to convert direct current (DC) into alternating current (AC).

BACKGROUND

A modulation scheme of a converter directly affects a switch state of the converter. A common modulation scheme is pulse width modulation (PWM). The PWM may include continuous pulse width modulation (CPWM) and discontinuous pulse width modulation (DPWM). Compared with the CPWM, the DPWM requires fewer switch times, and therefore has a smaller switching losses and can improve efficiency of the converter.

A quantity of switch bridge arms of a single-phase five-level converter is less than that of a three-phase converter. Therefore, the degrees of freedom in the control variables of the single-phase five-level converter are fewer than those of the three-phase converter. This causes difficulty in control design for the single-phase five-level converter. Currently, a control method for a single-phase five-level converter is specifically: obtaining a voltage vector of a single-phase alternating-current system; obtaining, by using a delay process, another voltage vector orthogonal to the voltage vector; converting the two voltage vectors into a three-phase modulated wave; generating, according to an existing discontinuous pulse width modulation (DPWM) method of a three-phase alternating-current system, a common-mode component that needs to be injected into the three-phase modulated wave; superposing an initial modulated wave of the single-phase system and the injected common-mode component to generate a modulated wave; and controlling an on/off state of a switch device based on the modulated wave. However, the foregoing control method for the single-phase five-level converter will cause a system delay by decreases the system response speed, which affects a system control characteristic.

SUMMARY

A technical problem to be resolved by embodiments of the present invention is to provide a control method and apparatus for a single-phase five-level converter, so as to improve a system response speed and system reliability.

According to a first aspect, an embodiment of this application provides a control method for a single-phase five-level converter. A control system may obtain a first-phase initial modulated wave of the single-phase five-level converter and a second-phase initial modulated wave of the single-phase five-level converter. In an embodiment, a control system may obtain a first-level modulated wave output by the single-phase five-level converter, a second-level modulated wave output by the single-phase five-level converter, a third-level modulated wave output by the single-phase five-level converter, a fourth-level modulated wave output by the single-phase five-level converter, and a fifth-level modulated wave output by the single-phase five-level converter. Then the control system calculates the first-level modulated wave, the second-level modulated wave, the third-level modulated wave, the fourth-level modulated wave, the fifth-level modulated wave, the first-phase initial modulated wave, and the second-phase initial modulated wave, to obtain a common-mode modulated wave. In an embodiment, the control system then calculates the first-phase initial modulated wave, the second-phase initial modulated wave, and the common-mode modulated wave, to obtain a pulse-width modulated wave.

Both the first-phase initial modulated wave and the second-phase initial modulated wave are sine waves, and a sum of an amplitude of the first-phase initial modulated wave at any moment and an amplitude of the second-phase initial modulated wave at the moment is zero.

A first level is a positive bus level on a direct-current side, a second level is a level between a zero level and the positive bus level on the direct-current side, a third level is the zero level, a fourth level is a level between a negative bus level on the direct-current side and the zero level, and a fifth level is the negative bus level on the direct-current side.

In this technical solution, the control system obtains the common-mode modulated wave based on initial modulated waves of two bridge arms (that is, the first-phase initial modulated wave and the second-phase initial modulated wave) of the single-phase five-level converter. This can avoid a thereotical third-phase algorithm process, eliminate a delay process, and improve a system response speed and system reliability.

In one embodiment, a specific manner of calculating, by the control system, the first-level modulated wave, the second-level modulated wave, the third-level modulated wave, the fourth-level modulated wave, the fifth-level modulated wave, the first-phase initial modulated wave, and the second-phase initial modulated wave, to obtain a common-mode modulated wave of the single-phase five-level converter may be: subtracting the first-phase initial modulated wave from a modulated wave corresponding to the positive bus level, to obtain a first modulated wave; subtracting the second-phase initial modulated wave from a modulated wave corresponding to a positive intermediate level, to obtain a second modulated wave; subtracting the first-phase initial modulated wave from a modulated wave corresponding to the zero level, to obtain a third modulated wave; subtracting the second-phase initial modulated wave from a modulated wave corresponding to a negative intermediate level, to obtain a fourth modulated wave; subtracting the first-phase initial modulated wave from a modulated wave corresponding to the negative bus level, to obtain a fifth modulated wave; and comparing the first modulated wave, the second modulated wave, the third modulated wave, the fourth modulated wave, and the fifth modulated wave, to determine the common-mode modulated wave. An amplitude of the common-mode modulated wave at any moment is an amplitude with a minimum absolute value among amplitudes of the first modulated wave, the second modulated wave, the third modulated wave, the fourth modulated wave, and the fifth modulated wave at the moment.

In this technical solution, the common-mode modulated wave obtained in this embodiment of this application is continuous without a step change, so that a common-mode leakage current can be effectively reduced, and a high-frequency common-mode voltage component is decreased.

In one embodiment, an amplitude of the first-level modulated wave, the second-level modulated wave, the third-level modulated wave, the fourth-level modulated wave, the fifth-level modulated wave, the first-phase initial modulated wave, or the second-phase initial modulated wave at any moment is greater than or equal to −1 and less than or equal to 1.

In one embodiment, the pulse-width modulated wave may include a sixth modulated wave and a seventh modulated wave. In this case, a specific manner of calculating, by the control system, the first-phase initial modulated wave, the second-phase initial modulated wave, and the common-mode modulated wave, to obtain a pulse-width modulated wave may be: adding the first-phase initial modulated wave and the common-mode modulated wave, to obtain the sixth modulated wave; and adding the second-phase initial modulated wave and the common-mode modulated wave, to obtain the seventh modulated wave.

In this technical solution, clamping states of the two bridge arms can be allocated based on a feature that each phase of the single-phase five-level converter can output five levels, so as to implement a loss balance between the two bridge arms.

According to a second aspect, an embodiment of this application provides a control apparatus for a single-phase five-level converter. The control apparatus for the single-phase five-level converter has a function of implementing the behavior of the control system in the example of the control method for the single-phase five-level converter according to the first aspect. The function may be implemented by hardware, or may be implemented by hardware by executing corresponding software. The hardware or the software includes one or more units or modules corresponding to the foregoing function.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

The following describes the embodiments of this application with reference to the accompanying drawings in the embodiments of this application.

Figure 1:
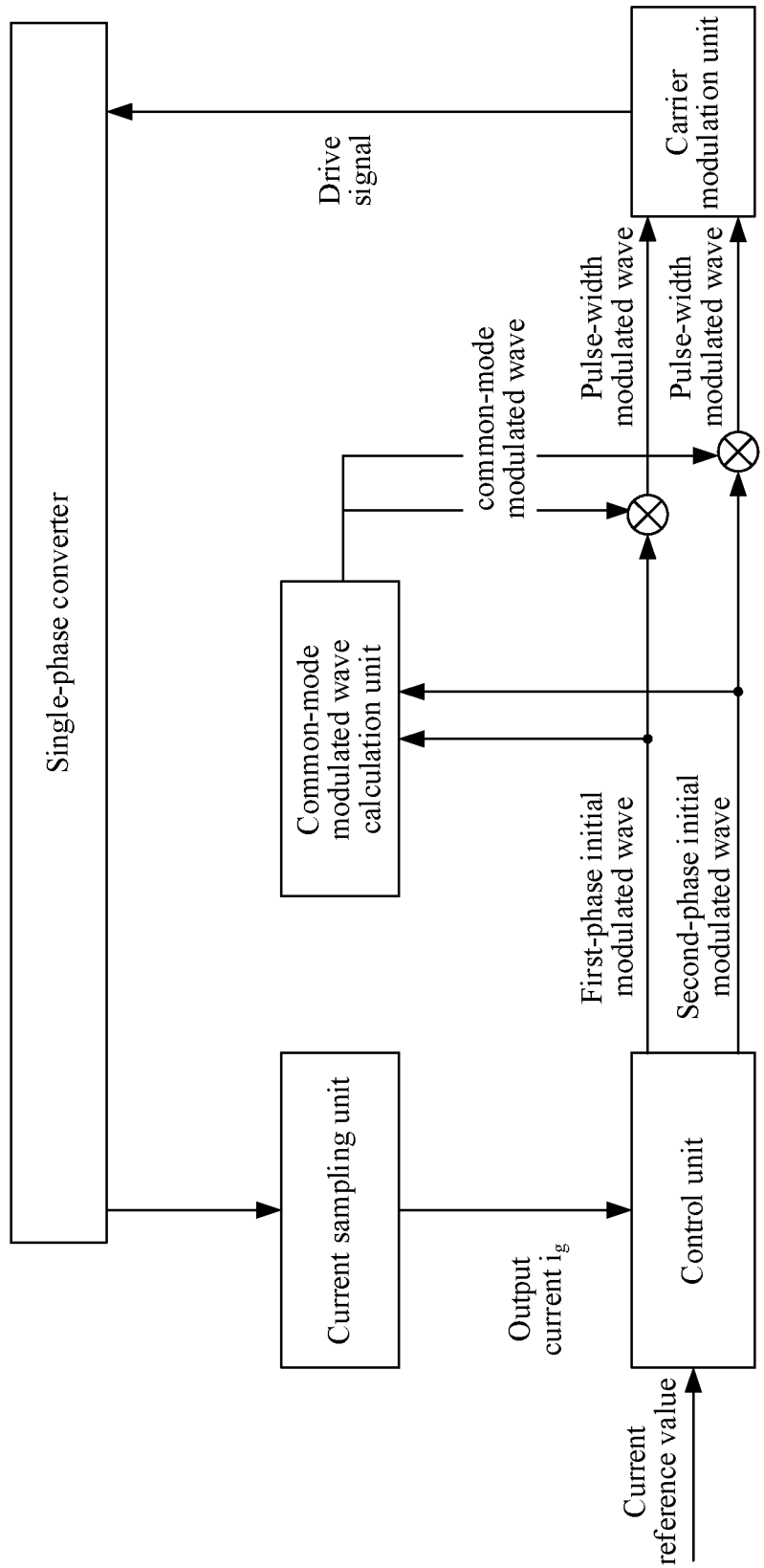
FIG. 1 is a schematic architectural diagram of a control system for a single-phase five-level converter according to an embodiment of this application.

To better understand a control method and apparatus for a single-phase five-level converter that are disclosed in the embodiments of this application, the following first describes a network architecture to which the embodiments of this application are applicable. FIG. 1 is a schematic architectural diagram of a control system for a single-phase five-level converter according to an embodiment of this application. As shown in FIG. 1, the control system for a single-phase five-level converter may include a single-phase five-level converter, a common-mode modulated wave calculation unit, a current sampling unit, a control unit, and a carrier modulation unit. The single-phase five-level converter is separately connected to the current sampling unit and the carrier modulation unit. The current sampling unit is connected to the control unit. The control unit is separately connected to the common-mode modulated wave calculation unit and the carrier modulation unit.

The current sampling unit is configured to obtain an output current (for example, $i_g$ in FIG. 2 or FIG. 3) from the single-phase five-level converter, and send the output current to the control unit.

The control unit is configured to calculate the output current and a current reference value to obtain a first-phase initial modulated wave and a second-phase initial modulated wave, and send the first-phase initial modulated wave and the second-phase initial modulated wave to the common-mode modulated wave calculation unit.

The common-mode modulated wave calculation unit is configured to calculate a first-level modulated wave, a second-level modulated wave, a third-level modulated wave, a fourth-level modulated wave, a fifth-level modulated wave, the first-phase initial modulated wave, and the second-phase initial modulated wave, to obtain a common-mode modulated wave.

The first-phase initial modulated wave and the second-phase initial modulated wave that are output by the control unit, and the common-mode modulated wave output by the common-mode modulated wave calculation unit are processed to obtain a pulse-width modulated wave. The pulse-width modulated wave is output to the carrier modulation unit.

The carrier modulation unit is configured to output a drive signal to the single-phase five-level converter based on the pulse-width modulated wave, to control different on/off states of switch assemblies (for example, $S_a$ and $S_b$ in FIG. 2, or $S_{a1}$, $S_{a2}$, $S_{a3}$, $S_{b1}$, $S_{b2}$, and $S_{b3}$ in FIG. 3) in the single-phase five-level converter, so that the single-phase five-level converter outputs different voltages.

Figure 2:
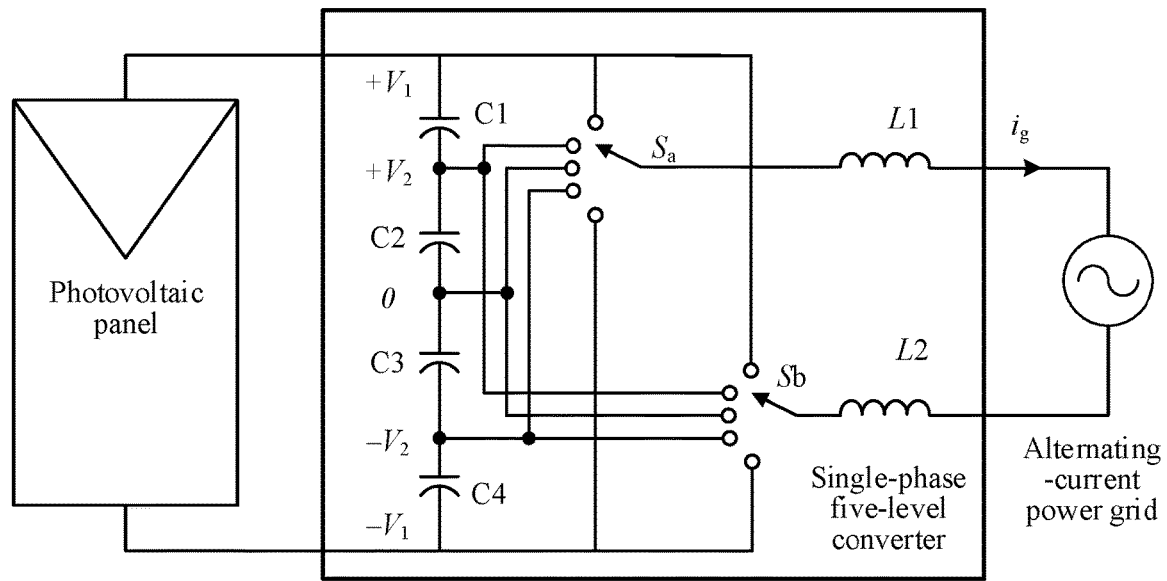
FIG. 2 is a schematic structural diagram of a single-phase five-level grid-tied photovoltaic system according to an embodiment of this application.

Using a schematic structural diagram of a single-phase five-level grid-tied photovoltaic system shown in FIG. 2 as an example, the single-phase five-level grid-tied photovoltaic system may include a photovoltaic panel, a single-phase five-level converter, and an alternating-current power grid, a direct-current side of the single-phase five-level converter is connected to the photovoltaic panel, and an alternating-current side of the single-phase five-level converter is connected to the alternating-current power grid by using a filter inductor (for example, L1 or L2). The single-phase five-level grid-tied photovoltaic system converts direct-current power generated by the photovoltaic panel into alternating-current power, and sends the alternating-current power to the alternating-current power grid.

In the single-phase five-level converter shown in FIG. 2, a positive electrode of a capacitor C1 is separately connected to the photovoltaic panel, a switch assembly $S_a$, and a switch assembly $S_b$; a negative electrode of the capacitor C1 is separately connected to a positive electrode of a capacitor C2, the switch assembly $S_a$, and the switch assembly $S_b$; a negative electrode of the capacitor C2 is separately connected to a positive electrode of a capacitor C3, the switch assembly $S_a$, and the switch assembly $S_b$; a negative electrode of the capacitor C3 is separately connected to a positive electrode of a capacitor C4, the switch assembly $S_a$, and the switch assembly $S_b$; a negative electrode of the capacitor C4 is separately connected to the photovoltaic panel, the switch assembly $S_a$, and the switch assembly $S_b$; the switch assembly $S_a$ is connected to the filter inductor L1; the filter inductor L1 is connected to the alternating-current power grid; the switch assembly $S_b$ is connected to the filter inductor L2; the filter inductor L2 is connected to the alternating-current power grid. A current output by the filter inductor L1 (or L2) is an output current $i_g$.

Voltage division is performed on a direct-current bus side of the single-phase five-level converter by using four capacitors C1, C2, C3, and C4, and two-phase bridge arms implement electric energy conversion between a direct-current side and an alternating-current side by using the switch assemblies $S_a$ and $S_b$. By controlling different on/off states of the bridge arm switch assemblies, five levels may be output at an alternating-current port. For example, a phase A (that is, a first phase) outputs a positive bus level (that is, a first level), where a voltage corresponding to the positive bus level is $V_1$; a positive intermediate level (that is, a second level), where a voltage corresponding to the positive intermediate level is $V_2$; a zero level (that is, a third level), where a voltage corresponding to the zero level is 0; a negative intermediate level (that is, a fourth level), where a voltage corresponding to the negative intermediate level is $-V_2$; and a negative bus level (that is, a fifth level), where a voltage corresponding to the negative bus level is $-V_1$. For another example, a phase B (that is, a second phase) outputs a positive bus level (that is, a first level), where a voltage corresponding to the positive bus level is $V_1$; a positive intermediate level (that is, a second level), where a voltage corresponding to the positive intermediate level is $V_2$; a zero level (that is, a third level), where a voltage corresponding to the zero level is 0; a negative intermediate level (that is, a fourth level), where a voltage corresponding to the negative intermediate level is $-V_2$; and a negative bus level (that is, a fifth level), where a voltage corresponding to the negative bus level is $-V_1$. $V_2<V_1$, for example, $V_2=V_1/2$.

It should be noted that a structure of a single-phase five-level energy storage system is similar to that of the single-phase five-level grid-tied photovoltaic system. A schematic structural diagram of the single-phase five-level energy storage system may be obtained by replacing the photovoltaic panel in FIG. 2 with a battery. The single-phase five-level energy storage system is configured to bidirectionally exchange energy between an alternating-current power grid and the battery.

Figure 3:
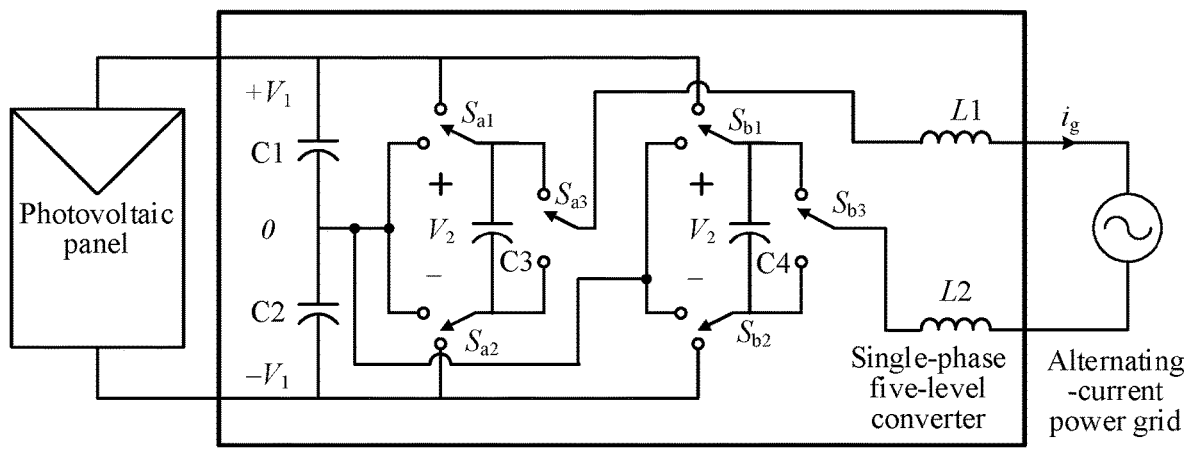
FIG. 3 is a schematic structural diagram of a single-phase five-level grid-tied photovoltaic system according to another embodiment of this application.

Using a schematic structural diagram of a single-phase five-level grid-tied photovoltaic system shown in FIG. 3 as an example, the single-phase five-level grid-tied photovoltaic system may include a photovoltaic panel, a single-phase five-level converter, and an alternating-current power grid, a direct-current side of the single-phase five-level converter is connected to the photovoltaic panel, and an alternating-current side of the single-phase five-level converter is connected to the alternating-current power grid by using a filter inductor (for example, L1 or L2). The single-phase five-level grid-tied photovoltaic system converts direct-current power generated by the photovoltaic panel into alternating-current power, and sends the alternating-current power to the alternating-current power grid.

In the single-phase five-level converter shown in FIG. 3, a positive electrode of a capacitor C1 is separately connected to the photovoltaic panel, a switch assembly $S_{a1}$, and a switch assembly $S_{b1}$; a negative electrode of the capacitor C1 is separately connected to a positive electrode of a capacitor C2, the switch assembly $S_{a1}$, a switch assembly $S_{a2}$, the switch assembly $S_{b1}$, and a switch assembly $S_{b2}$; a negative electrode of the capacitor C2 is separately connected to the photovoltaic panel, the switch assembly $S_{a2}$, and the switch assembly $S_{b2}$; a positive electrode of the capacitor C3 is separately connected to the switch assembly $S_{a1}$ and the switch assembly $S_{a3}$; a negative electrode of the capacitor C3 is separately connected to the switch assembly $S_{a2}$ and a switch assembly $S_{a3}$; the switch assembly $S_{a3}$ is connected to the filter inductor L1; the filter inductor L1 is connected to the alternating-current power grid; a positive electrode of a capacitor C4 is separately connected to the switch assembly $S_{b1}$ and a switch assembly $S_{b3}$; a negative electrode of the capacitor C4 is separately connected to the switch assembly $S_{b2}$ and the switch assembly $S_{b3}$; the switch assembly $S_{b3}$ is connected to the filter inductor L2; the filter inductor L2 is connected to the alternating-current power grid. A current output by the filter inductor L1 (or L2) is an output current $i_g$.

Voltage division is performed on a direct-current bus side of the single-phase five-level converter by using two capacitors C1 and C2. There is also a flying capacitor C3 between a direct-current side and an alternating-current side of a phase-A (that is, a first phase) bridge arm. There is also a flying capacitor C4 between a direct-current side and an alternating-current side of a phase-B (that is, a second phase) bridge arm. The two-phase bridge arms implement electric energy conversion between the direct-current side and the alternating-current side by using the switch assemblies $S_{a1}$, $S_{a2}$, $S_{a3}$, $S_{b1}$, $S_{b2}$, and $S_{b3}$. By controlling different on/off states of the bridge arm switch assemblies, five levels may be output at an alternating-current port. For example, a phase A outputs a positive bus level (that is, a first level), where a voltage corresponding to the positive bus level is $V_1$; a positive intermediate level (that is, a second level), where a voltage corresponding to the positive intermediate level is $V_1-V_2$; a zero level (that is, a third level), where a voltage corresponding to the zero level is 0; a negative intermediate level (that is, a fourth level), where a voltage corresponding to the negative intermediate level is $V_2-V_1$; and a negative bus level (that is, a fifth level), where a voltage corresponding to the negative bus level is $-V_1$. For another example, a phase B outputs a positive bus level (that is, a first level), where a voltage corresponding to the positive bus level is $V_1$; a positive intermediate level (that is, a second level), where a voltage corresponding to the positive intermediate level is $V_1-V_2$; a zero level (that is, a third level), where a voltage corresponding to the zero level is 0; a negative intermediate level (that is, a fourth level), where a voltage corresponding to the negative intermediate level is $V_2-V_1$; and a negative bus level (that is, a fifth level), where a voltage corresponding to the negative bus level is $-V_1$. $V_2<V_1$, for example, $V_2=V_1/2$.

It should be noted that a structure of a single-phase five-level energy storage system is similar to that of the single-phase five-level grid-tied photovoltaic system. A schematic structural diagram of the single-phase five-level energy storage system may be obtained by replacing the photovoltaic panel in FIG. 3 with a battery. The single-phase five-level energy storage system is configured to bidirectionally exchange energy between an alternating-current power grid and the battery.

Figure 4:
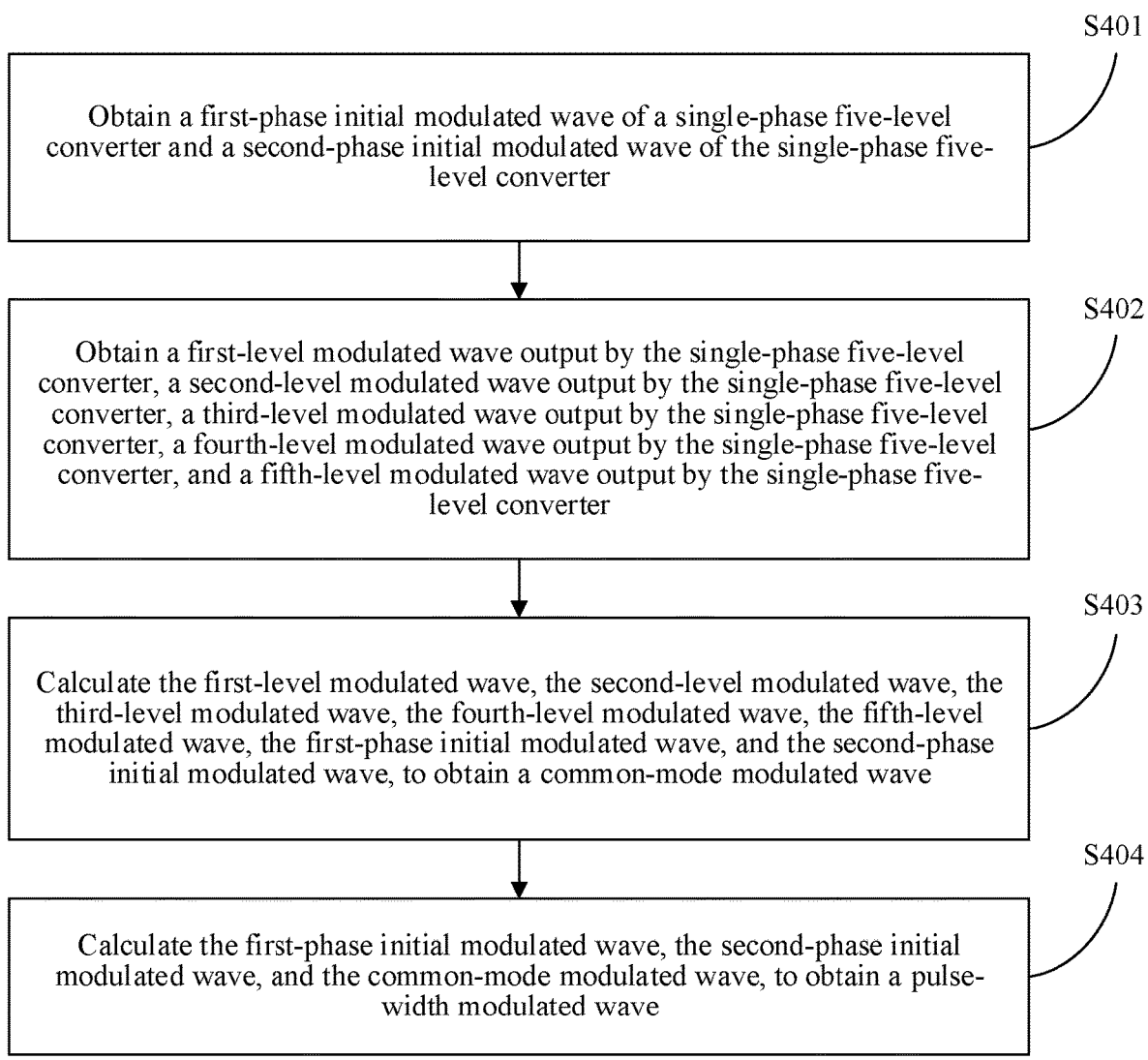
FIG. 4 is a schematic flowchart of a control method for a single-phase five-level converter according to an embodiment of this application.

Based on the schematic architectural diagram of the control system for a single-phase five-level converter shown in FIG. 1, FIG. 4 shows a control method for a single-phase five-level converter according to an embodiment of this application. The method includes but is not limited to the following operations.

Operation S401: Obtain a first-phase initial modulated wave of the single-phase five-level converter and a second-phase initial modulated wave of the single-phase five-level converter.

Figure 5:
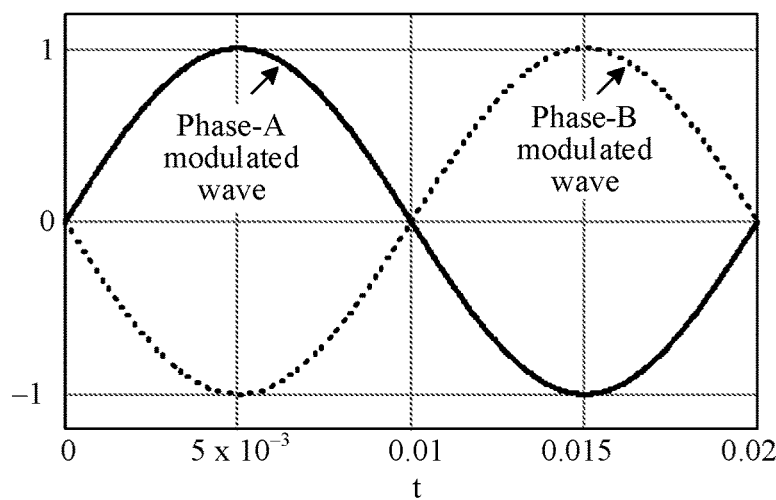
FIG. 5 is a schematic waveform diagram of an initial modulated wave according to an embodiment of this application.

Specifically, the control system may obtain an output current output by the single-phase five-level converter, and calculate the output current and a current reference value to obtain the first-phase initial modulated wave and the second-phase initial modulated wave. Using a schematic waveform diagram of an initial modulated wave shown in FIG. 5 as an example, both the first-phase initial modulated wave and the second-phase initial modulated wave are sine waves. An amplitude of the first-phase initial modulated wave at any moment is greater than or equal to −1 and less than or equal to 1, and an amplitude of the second-phase initial modulated wave at any moment is greater than or equal to −1 and less than or equal to 1. The first-phase initial modulated wave and the second-phase initial modulated wave satisfy the following relationship: A sum of an amplitude of the first-phase initial modulated wave at any moment and an amplitude of the second-phase initial modulated wave at the moment is zero, that is, $V_a=-V_b$, where $V_a$ represents the first-phase initial modulated wave, and $V_b$ represents the second-phase initial modulated wave.

Operation S402: Obtain a first-level modulated wave output by the single-phase five-level converter, a second-level modulated wave output by the single-phase five-level converter, a third-level modulated wave output by the single-phase five-level converter, a fourth-level modulated wave output by the single-phase five-level converter, and a fifth-level modulated wave output by the single-phase five-level converter.

The control system may further obtain the first-level modulated wave output by the single-phase five-level converter, the second-level modulated wave output by the single-phase five-level converter, the third-level modulated wave output by the single-phase five-level converter, the fourth-level modulated wave output by the single-phase five-level converter, and the fifth-level modulated wave output by the single-phase five-level converter. Amplitudes of the first-level modulated wave, the second-level modulated wave, the third-level modulated wave, the fourth-level modulated wave, and the fifth-level modulated wave at any moment are greater than or equal to −1 and less than or equal to 1.

In the single-phase five-level grid-tied photovoltaic system shown in FIG. 2, an amplitude of the first-level modulated wave output by the single-phase five-level converter is $V_1$, an amplitude of the second-level modulated wave is $V_2$, an amplitude of the third-level modulated wave is 0, an amplitude of the fourth-level modulated wave is $-V_2$, and an amplitude of the fifth-level modulated wave is $-V_1$. In the single-phase five-level grid-tied photovoltaic system shown in FIG. 3, an amplitude of the first-level modulated wave output by the single-phase five-level converter is $V_1$, an amplitude of the second-level modulated wave is $V_1-V_2$, an amplitude of the third-level modulated wave is 0, an amplitude of the fourth-level modulated wave is $V_2-V_1$, and an amplitude of the fifth-level modulated wave is $-V_1$.

It should be noted that the first-level modulated wave in this embodiment of this application may be obtained by performing normalization processing on a first-level modulated wave output by the single-phase five-level converter, that is, a voltage of the first-level modulated wave in this embodiment of this application at any moment is 1.

It should be noted that the second-level modulated wave in this embodiment of this application may be obtained by performing normalization processing on a second-level modulated wave output by the single-phase five-level converter, that is, a voltage of the second-level modulated wave in this embodiment of this application at any moment is 0.5.

It should be noted that the third-level modulated wave in this embodiment of this application may be obtained by performing normalization processing on a third-level modulated wave output by the single-phase five-level converter, that is, a voltage of the third-level modulated wave in this embodiment of this application at any moment is 0.

It should be noted that the fourth-level modulated wave in this embodiment of this application may be obtained by performing normalization processing on a fourth-level modulated wave output by the single-phase five-level converter, that is, a voltage of the fourth-level modulated wave in this embodiment of this application at any moment is −0.5.

It should be noted that the fifth-level modulated wave in this embodiment of this application may be obtained by performing normalization processing on a fifth-level modulated wave output by the single-phase five-level converter, that is, a voltage of the fifth-level modulated wave in this embodiment of this application at any moment is −1.

It should be noted that an execution sequence of operation S401 and operation S402 is not limited in this embodiment of this application. For example, the control system may perform operation S401 after operation S402. For another example, the control system may simultaneously perform operation S401 and operation S402.

Operation S403: Calculate the first-level modulated wave, the second-level modulated wave, the third-level modulated wave, the fourth-level modulated wave, the fifth-level modulated wave, the first-phase initial modulated wave, and the second-phase initial modulated wave, to obtain a common-mode modulated wave.

Specifically, a specific manner of obtaining a common-mode modulated wave by the control system may be: subtracting the first-phase initial modulated wave from the first-level modulated wave, to obtain a first modulated wave of the single-phase five-level converter; subtracting the second-phase initial modulated wave from the second-level modulated wave, to obtain a second modulated wave of the single-phase five-level converter; subtracting the first-phase initial modulated wave from the third-level modulated wave, to obtain a third modulated wave of the single-phase five-level converter; subtracting the second-phase initial modulated wave from the fourth-level modulated wave, to obtain a fourth modulated wave of the single-phase five-level converter; subtracting the first-phase initial modulated wave from the fifth-level modulated wave, to obtain a fifth modulated wave of the single-phase five-level converter; and comparing, by the control system, the first modulated wave, the second modulated wave, the third modulated wave, the fourth modulated wave, and the fifth modulated wave, to determine the common-mode modulated wave. An amplitude of the common-mode modulated wave at any moment is an amplitude with a minimum absolute value among amplitudes of the first modulated wave, the second modulated wave, the third modulated wave, the fourth modulated wave, and the fifth modulated wave at the moment.

Using FIG. 2 as an example, an amplitude of the first-level modulated wave is $V_1$, an amplitude of the second-level modulated wave is $V_2$, an amplitude of the third-level modulated wave is 0, an amplitude of the fourth-level modulated wave is $-V_2$, an amplitude of the fifth-level modulated wave is $-V_1$, the first-phase initial modulated wave is $V_a$, and the second-phase initial modulated wave is $V_b$. In this case, the control system may determine that an amplitude of the first modulated wave is $V_1-V_a$, an amplitude of the second modulated wave is $V_2-V_b$, an amplitude of the third modulated wave is $-V_a$, an amplitude of the fourth modulated wave is $-V_2-V_b$, and an amplitude of the fifth modulated wave is $-V_1-V_a$.

Using FIG. 3 as an example, an amplitude of the first-level modulated wave is $V_1$, an amplitude of the second-level modulated wave is $V_1-V_2$, an amplitude of the third-level modulated wave is 0, an amplitude of the fourth-level modulated wave is $V_2-V_1$, an amplitude of the fifth-level modulated wave is $-V_1$, the first-phase initial modulated wave is $V_a$, and the second-phase initial modulated wave is $V_b$. In this case, the control system may determine that an amplitude of the first modulated wave is $V_1-V_a$, an amplitude of the second modulated wave is $V_1-V_2-V_b$, an amplitude of the third modulated wave is $-V_a$, an amplitude of the fourth modulated wave is $V_2-V_1-V_b$, and an amplitude of the fifth modulated wave is $-V_1-V_a$.

Figure 6:
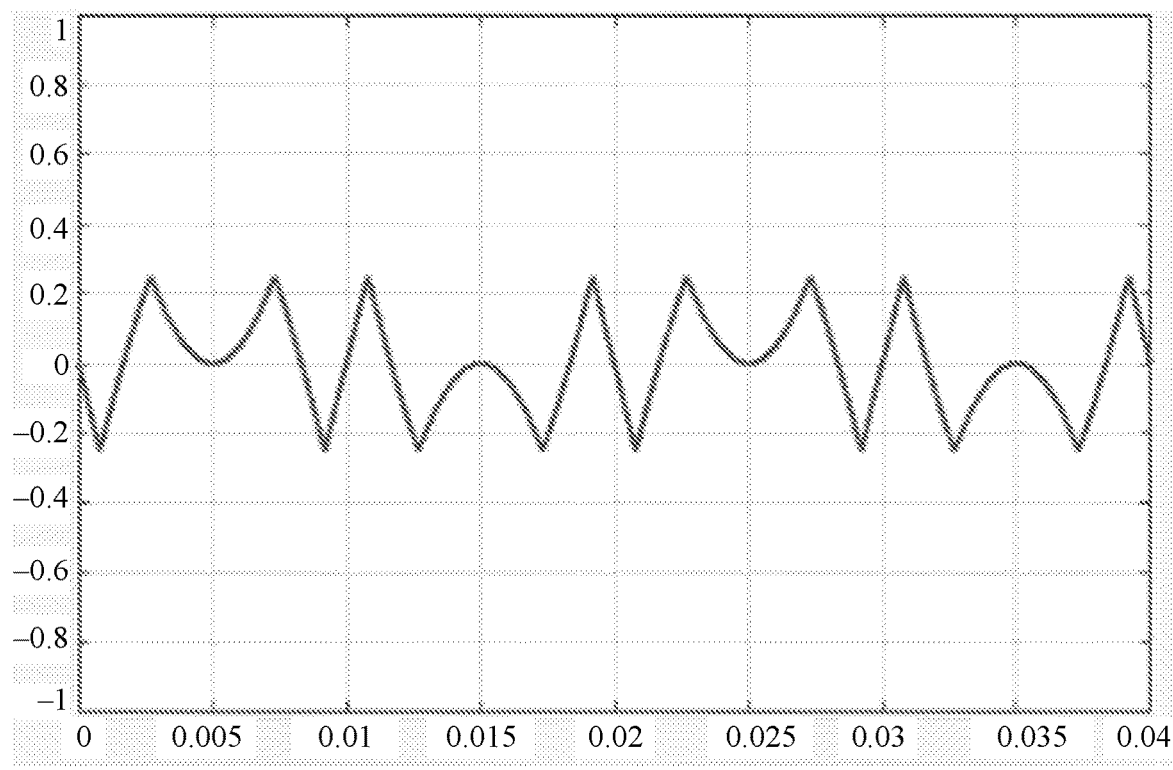
FIG. 6 is a schematic waveform diagram of a common-mode modulated wave according to an embodiment of this application.

It should be noted that if the first-level modulated wave, the second-level modulated wave, the third-level modulated wave, the fourth-level modulated wave, and the fifth-level modulated wave are all obtained through normalization processing, the control system may determine that an amplitude of the first modulated wave is $1-V_a$, an amplitude of the second modulated wave is $0.5-V_b$, an amplitude of the third modulated wave is $-V_a$, an amplitude of the fourth modulated wave is $-0.5-V_b$, and an amplitude of the fifth modulated wave is $-1-V_a$. A schematic waveform diagram of the common-mode modulated wave obtained by using the foregoing method may be shown in FIG. 6. The obtained common-mode modulated wave is continuous without a step change, thereby decreasing a high-frequency component and suppressing generation of a leakage current. In addition, an amplitude of the common-mode modulated wave in FIG. 6 is relatively small, and a generated amplitude of an equivalent common-mode voltage source is also relatively small, thereby helping suppress a common-mode current.

In another implementation, the control system may subtract the second-phase initial modulated wave from the first-level modulated wave, to obtain an eighth modulated wave; subtract the first-phase initial modulated wave from the second-level modulated wave, to obtain a ninth modulated wave; subtract the second-phase initial modulated wave from the third-level modulated wave, to obtain a tenth modulated wave; subtract the first-phase initial modulated wave from the fourth-level modulated wave, to obtain an eleventh modulated wave; subtract the second-phase initial modulated wave from the fifth-level modulated wave, to obtain a twelfth modulated wave; and compare the eighth modulated wave, the ninth modulated wave, the tenth modulated wave, the eleventh modulated wave, and the twelfth modulated wave, to determine a common-mode modulated wave. An amplitude of the common-mode modulated wave at any moment is an amplitude with a minimum absolute value among amplitudes of the eighth modulated wave, the ninth modulated wave, the tenth modulated wave, the eleventh modulated wave, and the twelfth modulated wave at the moment. The common-mode modulated wave obtained by using the foregoing method is symmetric to the common-mode modulated wave shown in FIG. 6 on a horizontal axis, and the obtained common-mode modulated wave is continuous without a step change.

Operation S404: Calculate the first-phase initial modulated wave, the second-phase initial modulated wave, and the common-mode modulated wave, to obtain a pulse-width modulated wave.

Specifically, the control system may add the first-phase initial modulated wave and the common-mode modulated wave to obtain a sixth modulated wave, and add the second-phase initial modulated wave and the common-mode modulated wave to obtain a seventh modulated wave. The sixth modulated wave and the seventh modulated wave form the pulse-width modulated wave. A schematic waveform diagram of the pulse-width modulated wave may be shown in FIG. 7, where $v_{a\_mod}$ represents the sixth modulated wave, and $v_{b\_mod}$ represents the seventh modulated wave. A phase-A modulated wave has three clamping states: +1 clamping, 0 clamping, and −1 clamping, corresponding to positive bus level clamping, zero level clamping, and negative bus level clamping. A phase-B modulated wave has two clamping states: +0.5 clamping and −0.5 clamping, corresponding to positive intermediate level clamping and negative intermediate level clamping. The clamping states appear alternately without overlapping. This also proves that the common-mode modulated wave in FIG. 6 continuously changes between the clamping states, and the clamping states cover an entire utility frequency period, so that control efficiency can be further improved. In addition, the clamping states of the phase-B modulated wave are +0.5 clamping and −0.5 clamping, instead of a zero clamping state, so that a loss reduction effect for a phase B can be improved. A schematic diagram of a phase-A bridge arm loss and a phase-B bridge arm loss may be shown in FIG. 8. The phase-A bridge arm loss is 53.36%, and the phase-B bridge arm loss is 46.64%, that is, a loss reduction effect for a phase-A bridge arm is close to that for a phase-B bridge arm. This implements a loss balance between the two bridge arms, and helps reduce costs and a size of a heat dissipation system.

Figure 7:
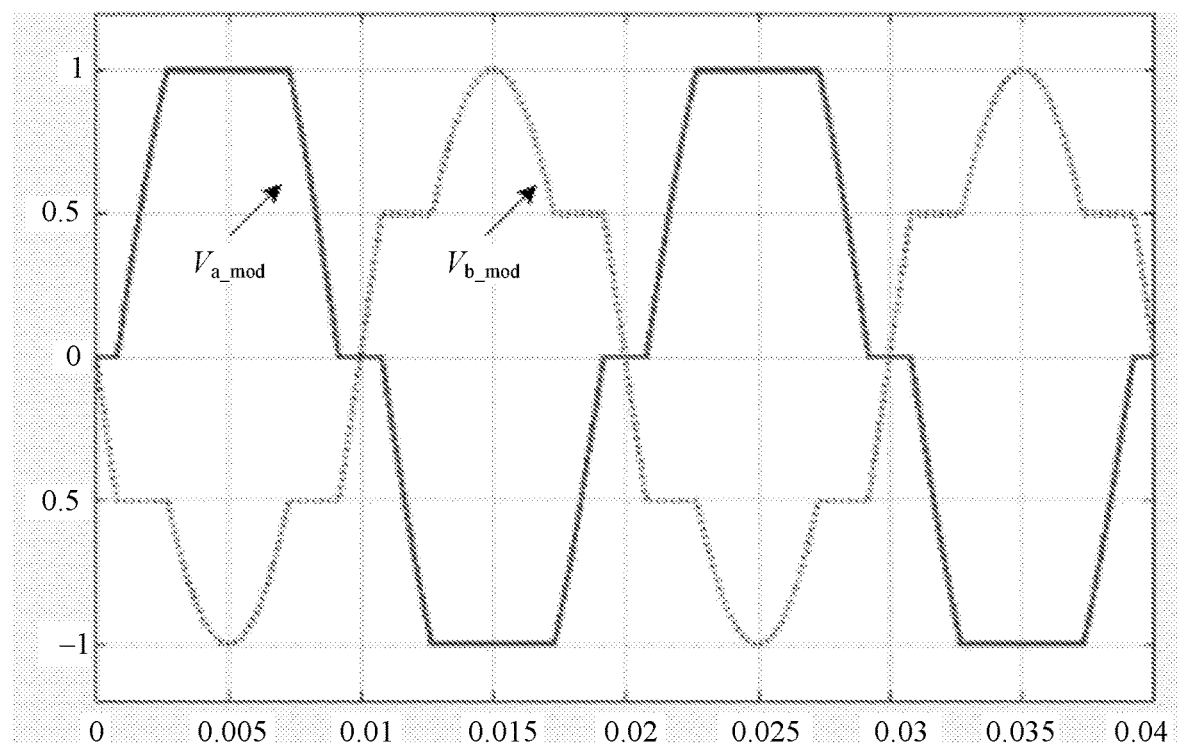
FIG. 7 is a schematic waveform diagram of a pulse-width modulated wave according to an embodiment of this application.
Figure 8:
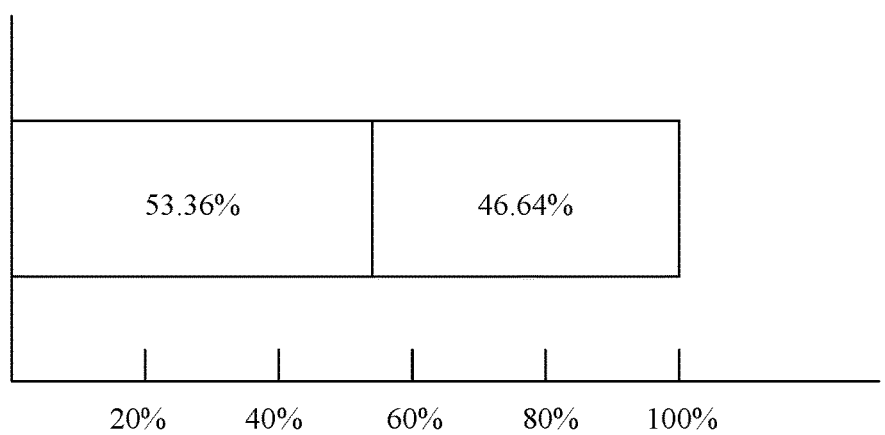
FIG. 8 is a schematic diagram of a phase-A bridge arm loss and a phase-B bridge arm loss according to an embodiment of this application.

Using the schematic waveform diagram of an output voltage of a single-phase five-level converter shown in FIG. 7 as an example, there is a correspondence between a phase-A output voltage and a clamping state of a phase-A modulated wave, and there is a correspondence between a phase-B output voltage and a clamping state of a phase-B modulated wave.

In the method described in FIG. 4, the first-level modulated wave, the second-level modulated wave, the third-level modulated wave, the fourth-level modulated wave, the fifth-level modulated wave, the first-phase initial modulated wave, and the second-phase initial modulated wave are calculated to obtain the common-mode modulated wave; and the first-phase initial modulated wave, the second-phase initial modulated wave, and the common-mode modulated wave are calculated to obtain the pulse-width modulated wave. This can avoid a theoretical third-phase algorithm process, eliminate a delay process, and improve a system response speed and system reliability.

The foregoing describes in detail the methods in the embodiments of this application. The following provides an apparatus in an embodiment of this application.

Figure 9:
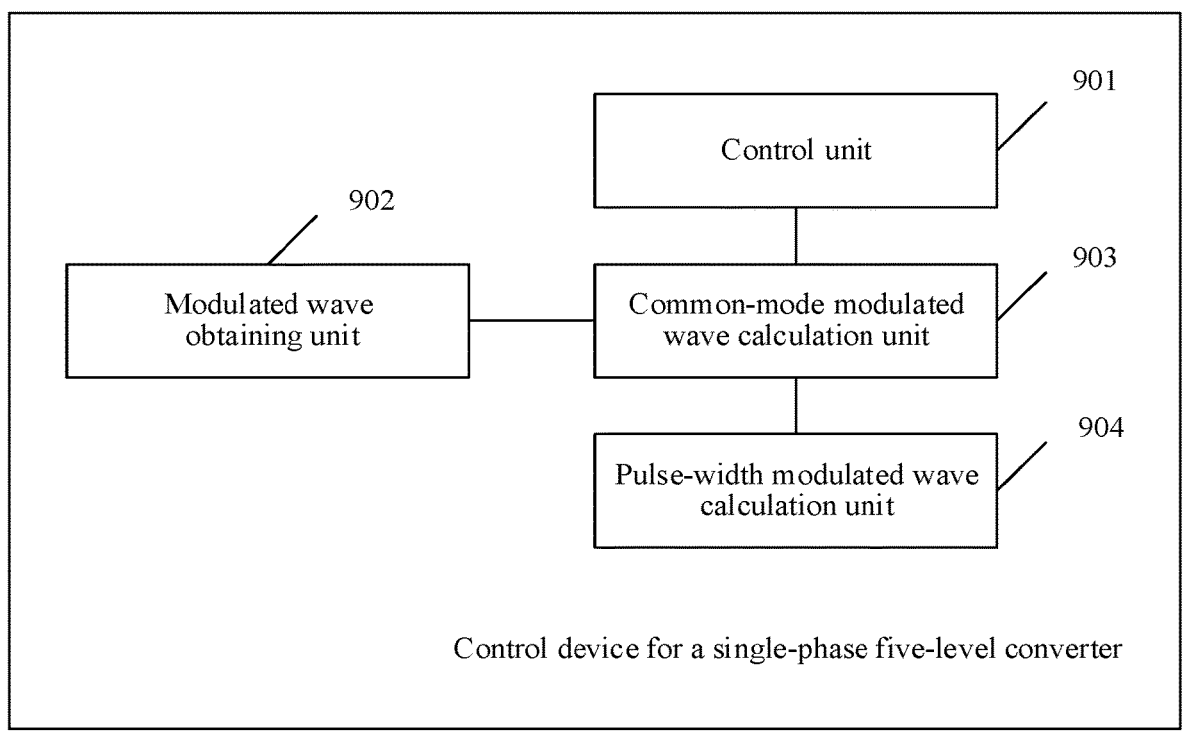
FIG. 9 is a schematic structural diagram of a control apparatus for a single-phase five-level converter according to an embodiment of this application.

FIG. 9 is a schematic structural diagram of a control apparatus for a single-phase five-level converter according to an embodiment of this application. The control apparatus is configured to implement the method in the embodiment in FIG. 4. The control apparatus for the single-phase five-level converter may include a control unit 901, a modulated wave obtaining unit 902, a common-mode modulated wave calculation unit 903, and a pulse-width modulated wave calculation unit 904. Detailed descriptions of the units are as follows:

The control unit 901 is configured to obtain a first-phase initial modulated wave of the single-phase five-level converter and a second-phase initial modulated wave of the single-phase five-level converter. Both the first-phase initial modulated wave and the second-phase initial modulated wave are sine waves, and a sum of an amplitude of the first-phase initial modulated wave at any moment and an amplitude of the second-phase initial modulated wave at the moment is zero.

The modulated wave obtaining unit 902 is configured to obtain a first-level modulated wave output by the single-phase five-level converter, a second-level modulated wave output by the single-phase five-level converter, a third-level modulated wave output by the single-phase five-level converter, a fourth-level modulated wave output by the single-phase five-level converter, and a fifth-level modulated wave output by the single-phase five-level converter. A first level is a positive bus level on a direct-current side, a second level is a level between a zero level and the positive bus level on the direct-current side, a third level is the zero level, a fourth level is a level between a negative bus level on the direct-current side and the zero level, and a fifth level is the negative bus level on the direct-current side.

The common-mode modulated wave calculation unit 903 is configured to calculate the first-level modulated wave, the second-level modulated wave, the third-level modulated wave, the fourth-level modulated wave, the fifth-level modulated wave, the first-phase initial modulated wave, and the second-phase initial modulated wave, to obtain a common-mode modulated wave of the single-phase five-level converter.

The pulse-width modulation wave calculation unit 904 is configured to calculate the first-phase initial modulated wave, the second-phase initial modulated wave, and the common-mode modulated wave, to obtain a pulse-width modulated wave of the single-phase five-level converter.

In one embodiment, the common-mode modulated wave calculation unit 903 is specifically configured to:

subtract the first-phase initial modulated wave from the first-level modulated wave, to obtain a first modulated wave of the single-phase five-level converter;

subtract the second-phase initial modulated wave from the second-level modulated wave, to obtain a second modulated wave of the single-phase five-level converter;

subtract the first-phase initial modulated wave from the third-level modulated wave, to obtain a third modulated wave of the single-phase five-level converter;

subtract the second-phase initial modulated wave from the fourth-level modulated wave, to obtain a fourth modulated wave of the single-phase five-level converter;

subtract the first-phase initial modulated wave from the fifth-level modulated wave, to obtain a fifth modulated wave of the single-phase five-level converter; and compare the first modulated wave, the second modulated wave, the third modulated wave, the fourth modulated wave, and the fifth modulated wave to determine the common-mode modulated wave, where an amplitude of the common-mode modulated wave at any moment is an amplitude with a minimum absolute value among amplitudes of the first modulated wave, the second modulated wave, the third modulated wave, the fourth modulated wave, and the fifth modulated wave at the moment.

In one embodiment, an amplitude of the first-level modulated wave, the second-level modulated wave, the third-level modulated wave, the fourth-level modulated wave, the fifth-level modulated wave, the first-phase initial modulated wave, or the second-phase initial modulated wave at any moment is greater than or equal to −1 and less than or equal to 1.

In one embodiment, the pulse-width modulated wave includes a sixth modulated wave and a seventh modulated wave, and the pulse-width modulated wave calculation unit 904 is specifically configured to:

add the first-phase initial modulated wave and the common-mode modulated wave, to obtain the sixth modulated wave; and add the second-phase initial modulated wave and the common-mode modulated wave, to obtain the seventh modulated wave.

It should be noted that, for implementation of the modules, corresponding reference may be further made to corresponding descriptions in the method embodiment shown in FIG. 4.

It should be noted that, in the embodiments of this application, division into the units is an example, is merely a logical function division, and may be other division in an actual implementation. The functional units in the embodiments of this application may be integrated into one unit, or may exist alone physically, or two or more units are integrated into one module. The foregoing integrated unit may be implemented in a form of hardware, or may be implemented in a form of a software functional module.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

What is claimed is:

1. A control method for a single-phase five-level converter, comprising:
    obtaining a first-phase initial modulated wave of the single-phase five-level converter and a second-phase initial modulated wave of the single-phase five-level converter, wherein both the first-phase initial modulated wave and the second-phase initial modulated wave are sine waves, and a sum of an amplitude of the first-phase initial modulated wave at any moment and an amplitude of the second-phase initial modulated wave at the moment is zero;
    obtaining a first-level modulated wave output by the single-phase five-level converter, a second-level modulated wave output by the single-phase five-level converter, a third-level modulated wave output by the single-phase five-level converter, a fourth-level modulated wave output by the single-phase five-level converter, and a fifth-level modulated wave output by the single-phase five-level converter, wherein a first level is a positive bus level on a direct-current side, a second level is a level between a zero level and the positive bus level on the direct-current side, a third level is the zero level, a fourth level is a level between a negative bus level on the direct-current side and the zero level, and a fifth level is the negative bus level on the direct-current side;
    calculating, based on the first-level modulated wave, the second-level modulated wave, the third-level modulated wave, the fourth-level modulated wave, the fifth-level modulated wave, the first-phase initial modulated wave, and the second-phase initial modulated wave, to obtain a common-mode modulated wave of the single-phase five-level converter; and
    calculating, based on the first-phase initial modulated wave, the second-phase initial modulated wave, and the common-mode modulated wave, to obtain a pulse-width modulated wave of the single-phase five-level converter, including adding the first-phase initial modulated wave and the common-mode modulated wave, to obtain a sixth modulated wave, wherein the pulse-width modulated wave comprises the sixth modulation wave and a seventh modulation wave.

2. The method according to claim 1, wherein the calculating, based on the first-level modulated wave, the second-level modulated wave, the third-level modulated wave, the fourth-level modulated wave, the fifth-level modulated wave, the first-phase initial modulated wave, and the second-phase initial modulated wave, to obtain a common-mode modulated wave of the single-phase five-level converter comprises:
    subtracting the first-phase initial modulated wave from the first-level modulated wave, to obtain a first modulated wave of the single-phase five-level converter;
    subtracting the second-phase initial modulated wave from the second-level modulated wave, to obtain a second modulated wave of the single-phase five-level converter;
    subtracting the first-phase initial modulated wave from the third-level modulated wave, to obtain a third modulated wave of the single-phase five-level converter;
    subtracting the second-phase initial modulated wave from the fourth-level modulated wave, to obtain a fourth modulated wave of the single-phase five-level converter;
    subtracting the first-phase initial modulated wave from the fifth-level modulated wave, to obtain a fifth modulated wave of the single-phase five-level converter; and
    comparing the first modulated wave, the second modulated wave, the third modulated wave, the fourth modulated wave, and the fifth modulated wave to determine the common-mode modulated wave, wherein an amplitude of the common-mode modulated wave at any moment is an amplitude with a minimum absolute value among amplitudes of the first modulated wave, the second modulated wave, the third modulated wave, the fourth modulated wave, and the fifth modulated wave at the moment.

3. The method according to claim 1, wherein an amplitude of the first-level modulated wave, the second-level modulated wave, the third-level modulated wave, the fourth-level modulated wave, the fifth-level modulated wave, the first-phase initial modulated wave, or the second-phase initial modulated wave at any moment is greater than or equal to −1 and less than or equal to 1.

4. The method according to claim 1, wherein the calculating the first-phase initial modulated wave, the second-phase initial modulated wave, and the common-mode modulated wave, to obtain a pulse-width modulated wave further comprises:
    adding the second-phase initial modulated wave and the common-mode modulated wave, to obtain the seventh modulated wave.

5. A control apparatus for a single-phase five-level converter, wherein the apparatus comprises:
    a control unit, configured to obtain a first-phase initial modulated wave of the single-phase five-level converter and a second-phase initial modulated wave of the single-phase five-level converter, wherein both the first-phase initial modulated wave and the second-phase initial modulated wave are sine waves, and a sum of an amplitude of the first-phase initial modulated wave at any moment and an amplitude of the second-phase initial modulated wave at the moment is zero;
    a modulated wave obtaining unit, configured to obtain a first-level modulated wave output by the single-phase five-level converter, a second-level modulated wave output by the single-phase five-level converter, a third-level modulated wave output by the single-phase five-level converter, a fourth-level modulated wave output by the single-phase five-level converter, and a fifth-level modulated wave output by the single-phase five-level converter, wherein a first level is a positive bus level on a direct-current side, a second level is a level between a zero level and the positive bus level on the direct-current side, a third level is the zero level, a fourth level is a level between a negative bus level on the direct-current side and the zero level, and a fifth level is the negative bus level on the direct-current side;
    a common-mode modulated wave calculation unit, configured to calculate, based on the first-level modulated wave, the second-level modulated wave, the third-level modulated wave, the fourth-level modulated wave, the fifth-level modulated wave, the first-phase initial modulated wave, and the second-phase initial modulated wave, to obtain a common-mode modulated wave of the single-phase five-level converter; and a pulse-width modulated wave calculation unit, configured to calculate, based on the first-phase initial modulated wave, the second-phase initial modulated wave, and the common-mode modulated wave, to obtain a pulse-width modulated wave of the single-phase five-level converter, including adding the first-phase initial modulated wave and the common-mode modulated wave, to obtain a sixth modulated wave, wherein the pulse-width modulated wave comprises the sixth modulation wave and a seventh modulation wave.

6. The apparatus according to claim 5, wherein the common-mode modulated wave calculation unit is configured to:
   subtract the first-phase initial modulated wave from the first-level modulated wave, to obtain a first modulated wave of the single-phase five-level converter;
   subtract the second-phase initial modulated wave from the second-level modulated wave, to obtain a second modulated wave of the single-phase five-level converter;
   subtract the first-phase initial modulated wave from the third-level modulated wave, to obtain a third modulated wave of the single-phase five-level converter;
   subtract the second-phase initial modulated wave from the fourth-level modulated wave, to obtain a fourth modulated wave of the single-phase five-level converter;
   subtract the first-phase initial modulated wave from the fifth-level modulated wave, to obtain a fifth modulated wave of the single-phase five-level converter; and
   compare the first modulated wave, the second modulated wave, the third modulated wave, the fourth modulated wave, and the fifth modulated wave to determine the common-mode modulated wave, wherein an amplitude of the common-mode modulated wave at any moment is an amplitude with a minimum absolute value among amplitudes of the first modulated wave, the second modulated wave, the third modulated wave, the fourth modulated wave, and the fifth modulated wave at the moment.

7. The apparatus according to claim 5, wherein an amplitude of the first-level modulated wave, the second-level modulated wave, the third-level modulated wave, the fourth-level modulated wave, the fifth-level modulated wave, the first-phase initial modulated wave, or the second-phase initial modulated wave at any moment is greater than or equal to −1 and less than or equal to 1.

8. The apparatus according to claim 5, wherein the pulse-width modulated wave calculation unit is configured to:
   add the second-phase initial modulated wave and the common-mode modulated wave, to obtain the seventh modulated wave.

9. A photovoltaic system, comprising:
   a photovoltaic panel;
   a single-phase five-level converter coupled to the photovoltaic panel for energy conversion between a direct-current and an alternating-current;
   a control apparatus coupled to the single-phase five-level converter to control the single-phase five-level converter, wherein the control apparatus comprises:
   a control unit, configured to obtain a first-phase initial modulated wave of the single-phase five-level converter and a second-phase initial modulated wave of the single-phase five-level converter, wherein both the first-phase initial modulated wave and the second-phase initial modulated wave are sine waves, and a sum of an amplitude of the first-phase initial modulated wave at any moment and an amplitude of the second-phase initial modulated wave at the moment is zero;
   a modulated wave obtaining unit, configured to obtain a first-level modulated wave output by the single-phase five-level converter, a second-level modulated wave output by the single-phase five-level converter, a third-level modulated wave output by the single-phase five-level converter, a fourth-level modulated wave output by the single-phase five-level converter, and a fifth-level modulated wave output by the single-phase five-level converter, wherein a first level is a positive bus level on a direct-current side, a second level is a level between a zero level and the positive bus level on the direct-current side, a third level is the zero level, a fourth level is a level between a negative bus level on the direct-current side and the zero level, and a fifth level is the negative bus level on the direct-current side;
   a common-mode modulated wave calculation unit, configured to calculate, based on the first-level modulated wave, the second-level modulated wave, the third-level modulated wave, the fourth-level modulated wave, the fifth-level modulated wave, the first-phase initial modulated wave, and the second-phase initial modulated wave, to obtain a common-mode modulated wave of the single-phase five-level converter; and
   a pulse-width modulated wave calculation unit, configured to calculate, based on the first-phase initial modulated wave, the second-phase initial modulated wave, and the common-mode modulated wave, to obtain a pulse-width modulated wave of the single-phase five-level converter, wherein the pulse-width modulated wave comprises a sixth modulation wave and a seventh modulation wave.

10. The photovoltaic system according to claim 9, wherein the common-mode modulated wave calculation unit is configured to:
    subtract the first-phase initial modulated wave from the first-level modulated wave, to obtain a first modulated wave of the single-phase five-level converter;
    subtract the second-phase initial modulated wave from the second-level modulated wave, to obtain a second modulated wave of the single-phase five-level converter;
    subtract the first-phase initial modulated wave from the third-level modulated wave, to obtain a third modulated wave of the single-phase five-level converter;
    subtract the second-phase initial modulated wave from the fourth-level modulated wave, to obtain a fourth modulated wave of the single-phase five-level converter;
    subtract the first-phase initial modulated wave from the fifth-level modulated wave, to obtain a fifth modulated wave of the single-phase five-level converter; and
    compare the first modulated wave, the second modulated wave, the third modulated wave, the fourth modulated wave, and the fifth modulated wave to determine the common-mode modulated wave, wherein an amplitude of the common-mode modulated wave at any moment is an amplitude with a minimum absolute value among amplitudes of the first modulated wave, the second modulated wave, the third modulated wave, the fourth modulated wave, and the fifth modulated wave at the moment.

11. The photovoltaic system according to claim 9, wherein an amplitude of the first-level modulated wave, the second-level modulated wave, the third-level modulated wave, the fourth-level modulated wave, the fifth-level modulated wave, the first-phase initial modulated wave, or the second-phase initial modulated wave at any moment is greater than or equal to −1 and less than or equal to 1.

12. The photovoltaic system according to claim 9, wherein the pulse-width modulated wave calculation unit is configured to:
   add the second-phase initial modulated wave and the common-mode modulated wave, to obtain the seventh modulated wave.

\* \* \* \* \*